Aug. 27, 1968     T. G. HILL     3,398,980
SWIVEL JOINT
Filed Sept. 20, 1965
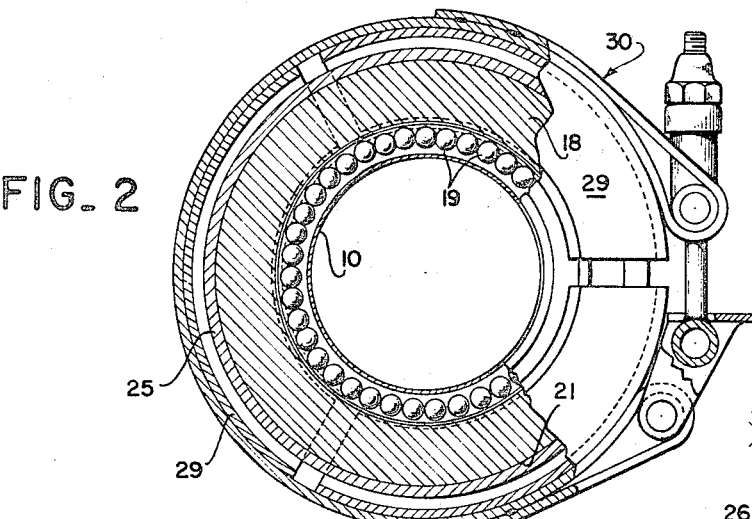
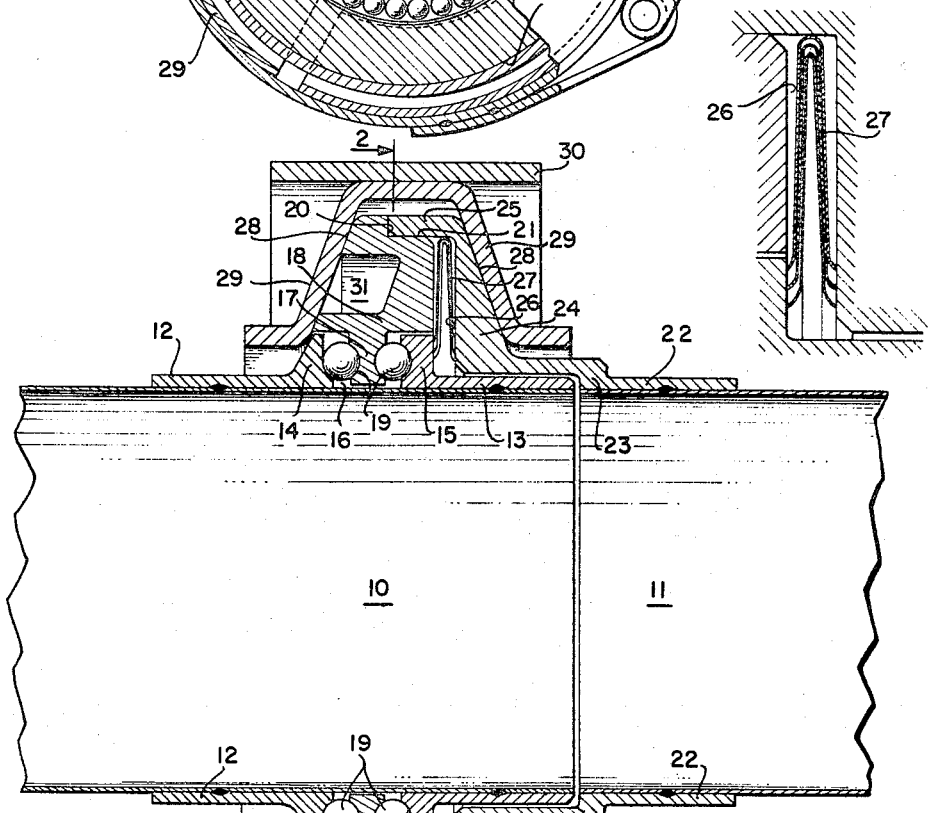
INVENTOR.
THOMAS GARDNER HILL
BY
*George Sullivan*
Agent

United States Patent Office 3,398,980
Patented Aug. 27, 1968

3,398,980
SWIVEL JOINT
Thomas Gardner Hill, Atlanta, Ga., assignor to Lockheed Aircraft Corporation, Burbank, Calif.
Filed Sept. 20, 1965, Ser. No. 488,666
1 Claim. (Cl. 285—98)

ABSTRACT OF THE DISCLOSURE

A low friction pressure type swivel joint of minimum size and weight incorporating a standard V band type clamp is provided as a coupling for sheet metal ducts. This joint is formed by two flanges attached to one duct end and defining ball bearing races that face each other and capture between them a multiplicity of balls separated by lateral ball bearing races projecting from a surrounding annular member. One side of this annular member is sloped to mate with one leg of the V clamp, and the other side is perpendicular and shouldered on top to mate with a single flange attached to the other duct end, so that the duct ends are held in true concentricity and a gap is created between the side of the annular member and single flange to accommodate a seal. The surface of the single flange opposite the gap slopes to mate with the other leg of the V clamp holding the joint together.

---

This invention relates to swivel joints by and through which adjacent ends of pipes or ducts disposed in axial alignment are interconnected and particularly to such a joint incorporating antifriction means to ensure the constant free and unrestricted relative rotation of the ducts joined under the most severe operation conditions.

Since the primary function of pipes or ducts is to conduct fluid, it is axiomatic that they be fluid-tight especially across connections, fittings, etc., where the several sections comprising the duct are interconnected. This is particularly difficult to achieve and maintain in installations where the interconnecting duct sections are required to rotate relative to each other. Heretofore, the best to be hoped for has been to form and prepare the associated duct ends in a precise manner to accurately align them to minimize rubbing friction and incorporate a seal of high wear-resistant material. This has resulted in specialized couplings constituting separate and distinct fittings which necessarily become large and bulky, involve multiple interfitting parts, and are difficult to properly assemble and install.

The present invention is directed toward improvements in swivel joints primarily by overcoming the above disadvantages of existing prior art devices and at the same time achieving results not heretofore possible. This is accomplished by means of and through the design of mating connectors adapted to be secured to the associated duct ends so as to form an integral part thereof and permit quick connection thereof in true axial alignment and subsequent disconnection. Such mating connectors include antifriction surfaces which permit the free and unrestricted relative rotation of the ducts when joined thereby, as well as a positive pressure seal to prevent fluid leakage at the joint that is totally isolated from the antifriction surfaces to thereby avoid possible contamination.

In addition these mating connectors are so constructed, organized and arranged that the resulting joint is relatively light and compact and yet highly reliable with an appreciably longer service life than customary with swivel joints in present use. Because of the noncomplexity of their design, these mating connectors are readily installed in their proper and intended position and maintained in such position in service.

More specifically, the connectors constituting the swivel joint herein proposed are formed by a pair of flanges one adapted to be secured to each duct end and overlap the other when the duct ends are brought together in axial alignment. Thus disposed releasable clamp means engages the flanges and secures them against all relative lateral movement. One of these flanges is made of multiple parts having adjacent surfaces opposed with antifriction means interposed and connecting the parts in spaced relation against all relative lateral movement. Another surface on one of these parts remote from the antifriction means is disposed in spaced relation to and adjacent a corresponding surface on the other flange, the space therebetween accommodating a seal effective to prevent fluid leakage from the interior of the connected ducts both through the flanges and the multiple parts that comprise one of these flanges.

With the above and other objects in view as will be apparent, this invention consists in the construction, and combination and arrangement of parts all as hereinafter more fully described, claimed and illustrated in the accompanying drawings wherein:

FIGURE 1 is a longitudinal section taken through a pair of ducts adjacent their associated ends to show a swivel joint designed and constructed in accordance with the teachings of the invention employed for the interconnection thereof;

FIGURE 2 is a transverse section therethrough taken along line 2—2 of FIGURE 1; and FIGURE 3 is an enlarged fragmentary view of the flanges of the associated duct ends as illustrated in FIGURE 1 to show the seal therebetween.

Referring with greater particularity to the drawings, 10 and 11 designate end portions of ducts to be joined in axial alignment for free relative rotation to each other. At its marginal end the duct 10 carries a pair of sleeves 12 and 13 each secured for example by seamwelding to the external surface thereof with adjacent ends terminating in flanges 14 and 15 separated by a space 16. The opposed faces of the flanges 14 and 15 are each grooved and constitute one race for coaction with a corresponding race formed in the opposite faces of a depending collar 17 integrally formed on and extending from a relatively rotatable ring 18. A plurality of balls 19 are disposed and freely operable in each set of races thus formed.

The ring 18 extends laterally of the sleeves 12 and 13 being disposed around the outer ends of the flanges 14 and 15 with the end faces thereof disposed in the plane of the remote faces of the flanges 14 and 15. The outer peripheral surface of the ring 18 is stepped as at 20 creating a shoulder 21 concentric about the longitudinal center line of the aligned ducts 10 and 11.

At its marginal end the duct 11 carries a sleeve 22 secured as by seamwelding to the external surface thereof. The sleeve 22 extends beyond the end of its duct 11 being offset as at 23 to pass over the sleeve 13 when the ducts 10 and 11 are located in substantial end-to-end abutment and terminates in a flange 24. At its outer end the flange 24 is formed or otherwise provided with a lateral projection 25 in the direction of and adapted to coact in bearing relation with the shoulder 21 on the ring 18. The length of the projection 25 is such that it abuts the step 20 when the ducts 10 and 11 are approximately in end-to-end abutment with the surface of the flange 24 in spaced relation to the adjacent face of the ring 18. Preferably, the surface of the flange 24 and the face of the ring 18 thus associated are parallelly disposed, thereby producing a gap 26 therebetween having a uniform transverse dimension.

A seal 27 is adapted to substantially fill and close the gap 26 overlying the adjoining edges of the ring 18 and the flange 15, thus preventing fluid leakage therebetween which otherwise could contact the ball bearings 19. This seal also prevents fluid leakage outwardly of the joint between the flange 24 and the ring 18. For this reason a standard, so-called chevron seal is preferred. In essence, a chevron seal is an annulus formed by multiple rings each generally V-shaped in section and fabricated of spring material. When operatively installed the multiple rings are stacked one within another with their open ends toward the fluid which if it passes thereto spreads the rings to perfect the seal.

With the ducts 10 and 11 and their respective end extensions located in the foregoing position, the coaction between the inner surface of the projection 25 and shoulder 21 assures the concentric alignment of the ducts 10 and 11, avoiding rubbing friction between the edge surfaces thereof. So positioned the end extensions on the ducts 10 and 11 constitute mating connectors adapted to be clampingly engaged and thereby secured against all relative lateral movement. To this end the remote faces of the flanges 24 and ring 18 are each angularly disposed as at 28 corresponding to arms 29 of a standard V band clamp 30 which thereby overlies and secures them against separation to maintain the ducts 10 and 11 in connected assembly. If desired, for lightening purposes the surface 28 of the ring 18 may be grooved, as at 31. Thus assembled, the ducts 10 and 11 are free for unrestricted relative rotation since they are effectively connected one to the other through the roller bearings 19.

It is to be understood that the foregoing disclosure is directed to a preferred embodiment illustrative, and for a clear understanding, of the invention. Various changes and modifications thereof will be apparent to those skilled in the art without departing from the true spirit and scope of the invention which is to be limited solely by the appended claim.

What is claimed is:
1. A swivel joint for relatively rotatable ducts disposed in axial alignment comprising a pair of mating connectors, one secured to the marginal end portion of each of said ducts, one of said connectors including a pair of axially spaced L-shaped members rigidly mounted about the entire outer periphery of a first one of said ducts with the short legs thereof disposed in radially outward opposed relation, the long leg of one of said members extending proximate the end of said first duct, an annular flange member having a radially inwardly extending annular leg member thereof disposed between and in bearing contact with each of said short legs of said L-shaped members whereby said annular flange member may rotate coaxially about said first duct but is restrained against axial or radial movement relative thereto, the other of said connectors including a partially angulated annular flange, said flange comprising radially spaced axially extending portions joined by a radially extending portion having the outer face thereof disposed at an acute angle and the inner face thereof disposed substantially normal to the axis of said duct, the radially inner portion being rigidly secured to said other duct and the radially outer portion extending over and in contact with a portion of said annular flange, said annular flange having its inner face disposed substantially parallel to but in axially spaced relation with the said inner face of said angulated flange forming a seal receiving space therebetween, the outer face of said annular flange being disposed at an acute angle to the axis of the ducts equal to but oppositely disposed with relation to the outer face of said angulated flange, fluid pressure responsive means operatively disposed in the said seal receiving space, said seal sealingly engaging the inner face of the short leg of one of said L-shaped members and the substantially radially disposed inner face of said angulated flange, and a circumferentially releasable clamp band operatively engaging the angularly disposed face of said annular and said angulated flanges to retain said ducts in axially immovable but relatively rotatable relation.

References Cited
UNITED STATES PATENTS

| | | | |
|---|---|---|---|
| 989,530 | 4/1911 | MacDuffee | 285—420 X |
| 1,151,334 | 8/1915 | Bell | 285—275 |
| 660,523 | 10/1900 | Walker | 277—205 X |
| 2,414,997 | 1/1947 | Alkins | 285—278 |
| Re. 23,283 | 10/1950 | Browne | 285—98 |
| 2,521,692 | 9/1950 | Costello | 277—205 X |
| 2,750,728 | 6/1956 | Bailey | 285—278 X |
| 2,862,731 | 12/1958 | Hedden et al. | 285—367 X |
| 3,180,662 | 4/1965 | Parlasca et al. | 285—367 X |
| 3,241,866 | 4/1966 | Jackson | 285—98 |
| 3,346,275 | 10/1967 | Jardins | 285—98 |

FOREIGN PATENTS 915,065  1/1963  Great Britain.

EDWARD C. ALLEN, *Primary Examiner.*

RICHARD G. BERKLEY, *Assistant Examiner.*